L. E. BRADT.
TROLLEY HARP.
APPLICATION FILED OCT. 5, 1909.
971,485.
Patented Sept. 27, 1910.
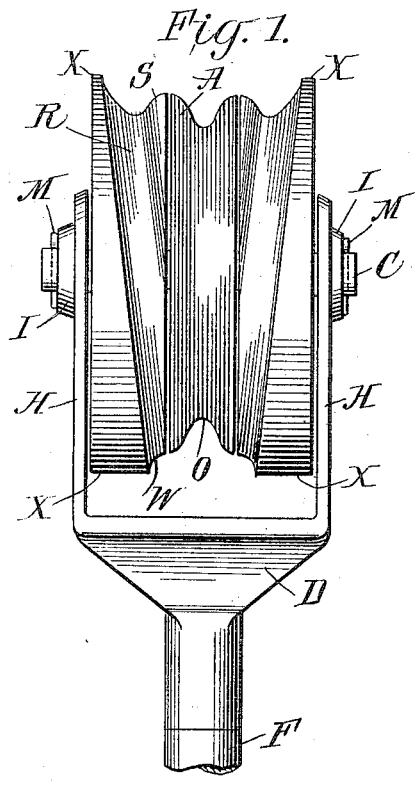
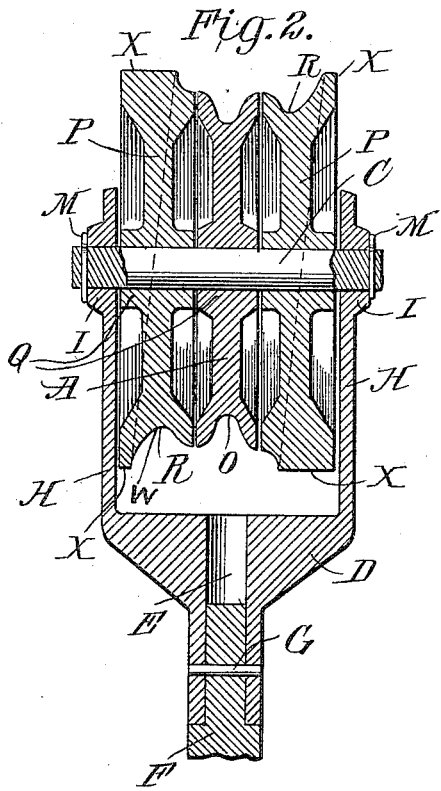
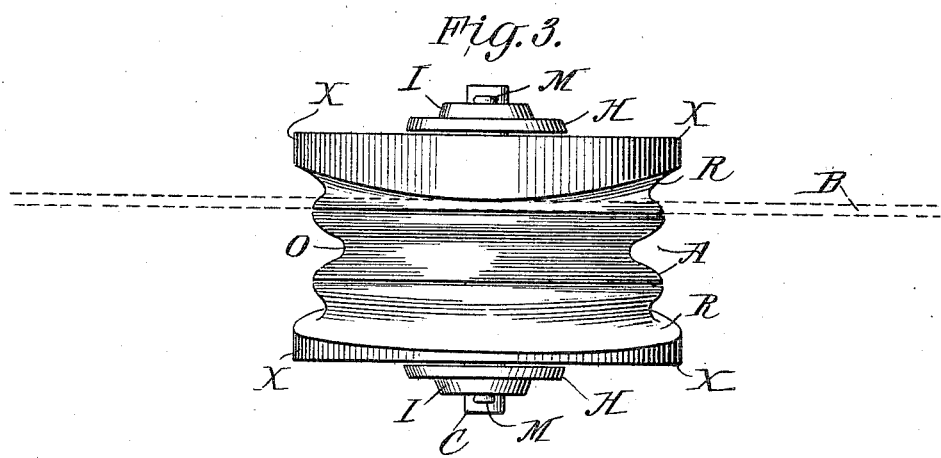
WITNESSES
Samuel E. Wade.
C. E. Thomas
INVENTOR
Lewis E. Bradt
BY Munn & Co.
ATTORNEYS
THE NORRIS PETERS CO., WASHINGTON, D. C.

UNITED STATES PATENT OFFICE.

LEWIS E. BRADT, OF SANTA MONICA, CALIFORNIA.

TROLLEY-HARP.

971,485.

Specification of Letters Patent.

Patented Sept. 27, 1910.

Application filed October 5, 1909. Serial No. 521,081.

*To all whom it may concern:*

Be it known that I, LEWIS E. BRADT, a citizen of the United States, and a resident of Santa Monica, in the county of Los Angeles and State of California, have invented certain new and useful Improvements in Trolley-Harps, of which the following is a specification.

My invention is an improvement in trolley harps, and consists in certain novel constructions, and combinations of parts hereinafter described and claimed.

The object of the invention is to provide a device of the class described, which will lessen the liability of disengagement of the wheel from the wire, and engage the wire and conduct or guide the wheel back to the wire when it is displaced.

Referring to the drawings forming a part hereof, Figure 1 is a front view of the improvement. Fig. 2 is a vertical section and Fig. 3 is a plan view.

The embodiment of the invention shown in the drawings, consists of a trolley wheel A for engagement with the wire B, the wheel being journaled on a journal pin C, which is supported by the harp D. The harp comprises a body portion D having a socket E, for receiving the pole F, which is secured in place by a pin G, and arms H, having bearings I, in which the pin C is journaled, the pin being retained in place by cotter pins M.

The trolley wheel is provided with an annular groove O, for receiving the wire, and upon each side of the said wheel is arranged a replacing wheel P. Each of the wheels P and the wheel A is provided with a hub Q, which extends upon each side thereof, and acts as a spacing member for the wheels, as shown in Fig. 2. Each of the wheels P is provided with an annular groove R eccentric to the axis of the wheel, and the plane of the groove is inclined in such manner that at the high part of the eccentric groove, the bottom of the said groove is flush with the top of the side wall of the groove of the trolley wheel. The plane of the groove is so placed with respect to the wheel, that at the low part of the eccentricity, the groove is separated from the trolley wheel by a shoulder S, while on the high part it is devoid of an inner side wall, the groove being merely a substantially angular channel W in the edge of the wheel.

The wheels P are of somewhat greater diameter than the wheel A, as will be evident from an inspection of any of the figures, and the outer wall X of the groove R is of greater height than the shoulder or inner wall S, and also of greater height than the side walls of the groove O in the wheel A. At the point where the groove R converges with the trolley wheel, the bottom of the said groove is on a level with the side walls of the groove of the trolley wheel, so that there is no obstruction to the passage of the wire from the groove R of the side wheels into the groove O of the trolley wheel.

With the above construction, the trolley wheel proper is guarded on each side with a continuous annular wall of greater height than the walls of the trolley wheel groove, and the said walls converge toward the trolley wheel from both directions.

In operation, should the wire escape from the groove, it will strike one of the walls X. The movement of the car to which the wheel is attached will cause the said wheel to rotate, and the wire will be forced back into its proper groove by the converging walls X, and by the eccentricity of the grooves.

It will be evident from the description that the device while simply constructed, is yet efficient for the purpose, the size of the wheel is not greatly increased, and but little is added to its cost. Neither are there any complicated parts to get out of order.

It will be noticed from an inspection of the drawing, that the outer wall of the groove in each of the replacing wheels is higher than the outer wall of the groove of the trolley wheel in all positions of the said wheel. By this construction, the replacing wheels are balanced, and there is little or no friction in replacing. Furthermore the outer walls of the replacing wheel prevent a complete disengagement of the wire from the wheels, the said outer walls acting as guards to limit the lateral movement of the wire with respect to the wheels.

It will be understood that applicant's wheel is not eccentric to the pin upon which it is journaled but the groove is eccentric. The wheels are thus balanced so that unnecessary friction is eliminated.

I claim:

1. In combination with the trolley wheel, of a replacing wheel on each side thereof and coaxial therewith, said replacing wheels being concentric with the axis of the trolley wheel, each of the said replacing wheels having a groove eccentric to its axis and merging at the highest point into the face adjacent to the trolley wheel, the said highest point being substantially flush with the periphery of the trolley wheel and the outer wall of the groove on each of said replacing wheels extending beyond the periphery of the trolley wheel to form a guard on the side thereof for the purpose specified.

2. In combination with the trolley wheel, of a replacing wheel on each side thereof of greater diameter than the trolley wheel and coaxial therewith, the said replacing wheels being concentric with the axis of the trolley wheel, each of said replacing wheels having a groove eccentric to the axis and merging at the highest point into the face adjacent to the trolley wheel, said highest point being substantially flush with the periphery of the trolley wheel.

LEWIS E. BRADT.

Witnesses:
   FORCE PARKER,
   SAMUEL R BREARLEY.